(12) United States Patent
Okumura et al.

(10) Patent No.: US 9,473,254 B2
(45) Date of Patent: Oct. 18, 2016

(54) APPARATUS AND DESIGN METHOD

(71) Applicant: Socionext Inc., Yokohama-shi, Kanagawa (JP)

(72) Inventors: Takaaki Okumura, Kunitachi (JP); Kenji Suzuki, Hachioji (JP); Osamu Yamasaki, Kokubunji (JP)

(73) Assignee: Socionext, Inc., Yokohama (JP)

( * ) Notice: Subject to any disclaimer, the term of this patent is extended or adjusted under 35 U.S.C. 154(b) by 0 days.

(21) Appl. No.: 14/721,347

(22) Filed: May 26, 2015

(65) Prior Publication Data

US 2015/0358146 A1    Dec. 10, 2015

(30) Foreign Application Priority Data

Jun. 4, 2014 (JP) ................. 2014-115812

(51) Int. Cl.
| | |
|---|---|
| *H04L 7/00* | (2006.01) |
| *H04L 25/00* | (2006.01) |
| *H04L 25/40* | (2006.01) |
| *H04B 15/00* | (2006.01) |
| *G06F 1/04* | (2006.01) |
| *H04B 15/04* | (2006.01) |
| *G06F 17/50* | (2006.01) |

(52) U.S. Cl.
CPC .............. *H04B 15/005* (2013.01); *G06F 1/04* (2013.01); *G06F 17/50* (2013.01); *H04B 15/04* (2013.01)

(58) Field of Classification Search
None
See application file for complete search history.

(56) References Cited

U.S. PATENT DOCUMENTS

2002/0147553 A1* 10/2002 Shimazaki ......... G01R 31/2855
                                                                                     702/65
2006/0220751 A1* 10/2006 Nakashiba ....... G01R 31/31709
                                                                                      331/16
2011/0295536 A1    12/2011   Yoda et al.

FOREIGN PATENT DOCUMENTS

| JP | 2006-277557 A | 10/2006 |
|---|---|---|
| JP | 2009-282916 A | 12/2009 |
| JP | 2011-248843 A | 12/2011 |

* cited by examiner

*Primary Examiner* — Chieh M Fan
*Assistant Examiner* — Wednel Cadeau
(74) *Attorney, Agent, or Firm* — Arent Fox LLP

(57) ABSTRACT

A correlation between noise injection time at which a power supply noise signal is applied to a clock path and a path delay of the clock path at the time of the power supply noise signal being applied is acquired. Furthermore, noise injection time width based on a clock signal inputted from a circuit arranged before the clock path to the clock path is set. The differences between path delays within the set noise injection time width are calculated by the use of the acquired correlation and the maximum value of the differences is estimated to be clock jitter of the clock path. The estimated clock jitter is smaller than the worst value and overestimation is prevented.

12 Claims, 15 Drawing Sheets

APPARATUS AND DESIGN METHOD

CROSS-REFERENCE TO RELATED APPLICATION

This application is based upon and claims the benefit of priority of the prior Japanese Patent Application No. 2014-115812, filed on Jun. 4, 2014, the entire contents of which are incorporated herein by reference.

FIELD

The embodiments discussed herein are related to a design apparatus and a design method.

BACKGROUND

In semiconductor integrated circuits, power supply noise which appears as a result of the operation of a circuit section around a clock path may have an influence on the clock path and clock jitter may occur in a transmitted clock signal. A technique for calculating clock jitter which occurs due to power supply noise and a technique for designing a semiconductor integrated circuit with calculated clock jitter taken into consideration are known.

Japanese Laid-open Patent Publication No. 2009-282916

In order to calculate clock jitter of a clock path, for example, a technique for considering the difference between the maximum path delay and the minimum path delay of the clock path, that is to say, the maximum value of the differences between path delays of the clock path as clock jitter is used. Calculated clock jitter is taken into consideration at design time. However, if clock jitter is overestimated, the difficulty of designing a semiconductor integrated circuit which meets required specifications may increase. In addition, as a result, turn around time (TAT) for design may lengthen.

SUMMARY

According to an aspect, there is provided a design apparatus including a processor which acquires a correlation between timing at which a noise signal is applied to a clock path and a path delay of the clock path, which sets a width of the timing based on a first clock signal inputted to the clock path, and which calculates differences between path delays within the width by the use of the correlation and considers a maximum value of the differences as clock jitter of the clock path.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1A:
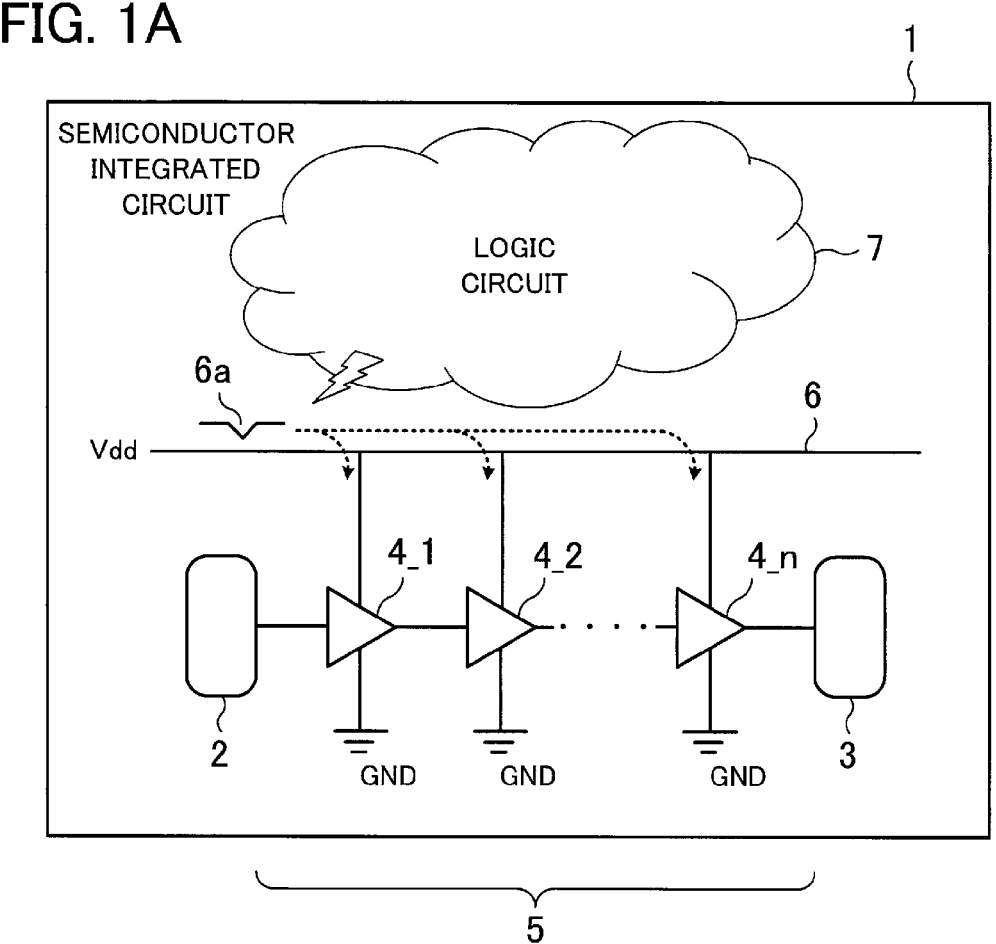
FIGS. 1A and 1B are views for describing a clock path and clock jitter.

Embodiments will now be described with reference to the accompanying drawings, wherein like reference numerals refer to like elements throughout.

First a clock path and clock jitter will be described.

Figure 1B:
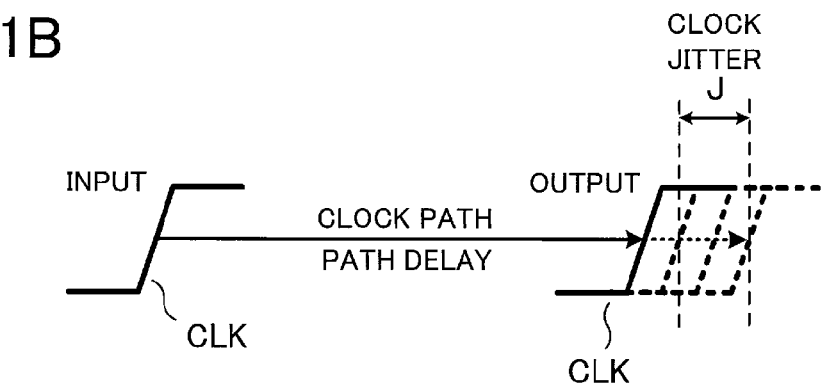

FIGS. 1A and 1B are views for describing a clock path and clock jitter. FIG. 1A schematically illustrates an example of the structure of a semiconductor integrated circuit. FIG. 1B illustrates an example of a clock signal transmitted along a clock path.

A semiconductor integrated circuit 1 illustrated in FIG. 1A is, for example, a semiconductor chip (die) such as large scale integration (LSI). The semiconductor integrated circuit 1 includes a circuit 2, such as a phase locked loop (PLL), which outputs a determined clock signal CLK and an intellectual property (IP) circuit 3, such as a memory.

The circuits 2 and 3 are connected by a clock path 5 along which the clock signal CLK outputted from the circuit 2 is transmitted to the circuit 3. The clock path includes a plurality of buffers 4_x (x is a natural number from 1 to n) connected. Each buffer 4_x is connected to a power supply line 6 to which power supply voltage Vdd is applied, and is connected to GND.

The clock signal CLK (FIG. 1B) outputted from the circuit 2 is inputted to the clock path 5, is transmitted along the clock path 5, and is outputted to the circuit 3. Transmission time (delay caused by transmission) from the time when the clock signal CLK is inputted to the clock path 5 to the time when the clock signal CLK is outputted from the clock path 5 corresponds to a path delay of the clock path 5. The path delay of the clock path 5 may include a delay caused by each buffer 4_x and a delay caused by a wiring between buffers 4_x.

The semiconductor integrated circuit 1 illustrated in FIG. 1A further includes a logic circuit 7 which is arranged outside the clock path 5 and which has various logical processing functions. The logic circuit 7 may include a plurality of logic circuit sections which operate at the same frequency or different frequencies.

In the semiconductor integrated circuit 1, noise may appear due to the operation of the logic circuit 7 and power supply noise (power supply noise signal or power supply noise waveform) 6a may appear on the power supply line 6 (FIG. 1A). When the power supply noise signal 6a is propagated through (applied to) a buffer 4_x included in the clock path 5, a path delay may fluctuate. This may lead to fluctuations (jitter) in the clock signal CLK outputted from the clock path 5. This jitter is clock jitter J (FIG. 1B) of the clock path 5.

The clock jitter J may be an important factor in the design of the semiconductor integrated circuit 1. The technique of considering the difference between the maximum path delay and the minimum path delay (maximum value of the differences between path delays) of the target clock path 5 as the clock jitter J is known as a technique for estimating the clock jitter J. In this case, this clock jitter J is taken into consideration and timing design and the like are performed so that this clock jitter J will be tolerated.

However, if the technique of considering the difference between the maximum path delay and the minimum path delay of the clock path 5 as the clock jitter J is adopted, then the clock jitter J may be overestimated. If the clock jitter J is overestimated, then the difficulty of the design (layout design including timing design) of the semiconductor integrated circuit 1 which meets required specifications may increase. In addition, as a result, TAT for the design may lengthen.

Preventing overestimation of the clock jitter J of the target clock path 5 and estimating the clock jitter J properly are effective in designing the semiconductor integrated circuit 1.

Accordingly, a design method for properly estimating the clock jitter J of the above clock path 5 will now be described.

A first embodiment will be described first.

Figure 2:
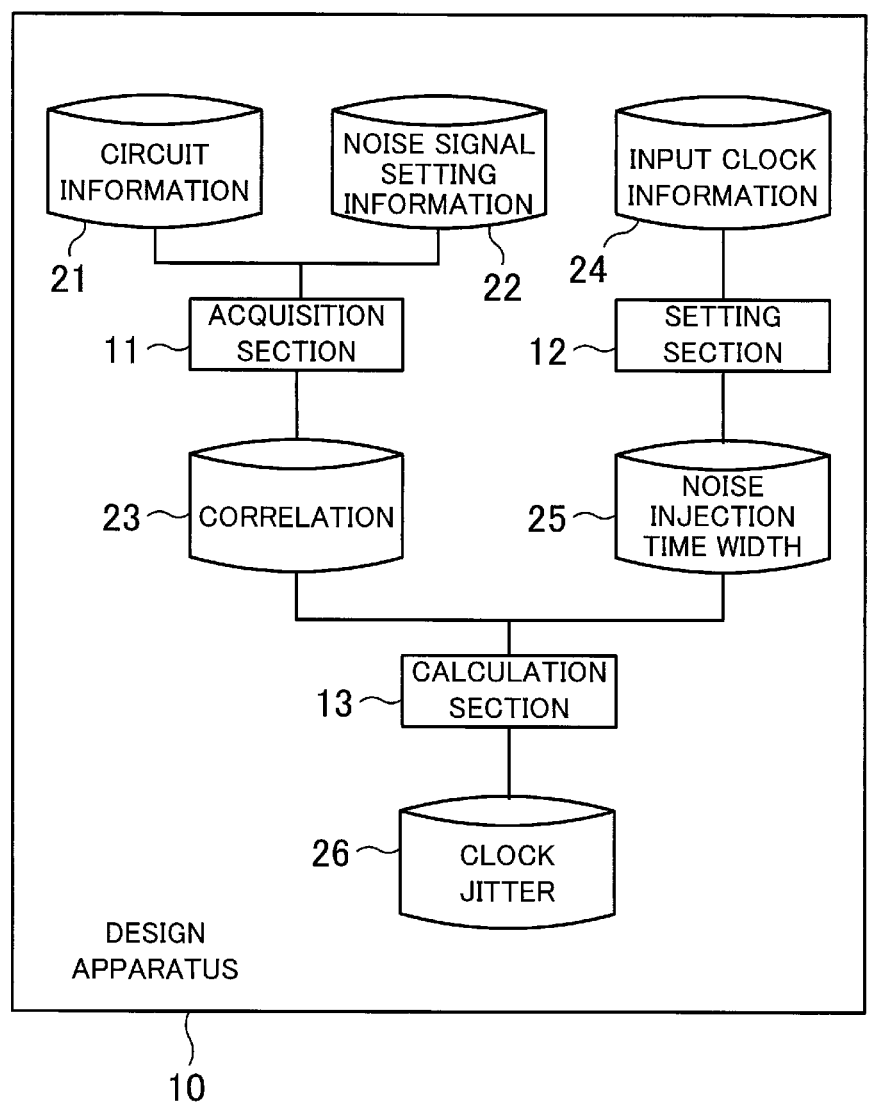
FIG. 2 illustrates an example of a design apparatus.
Figure 3:
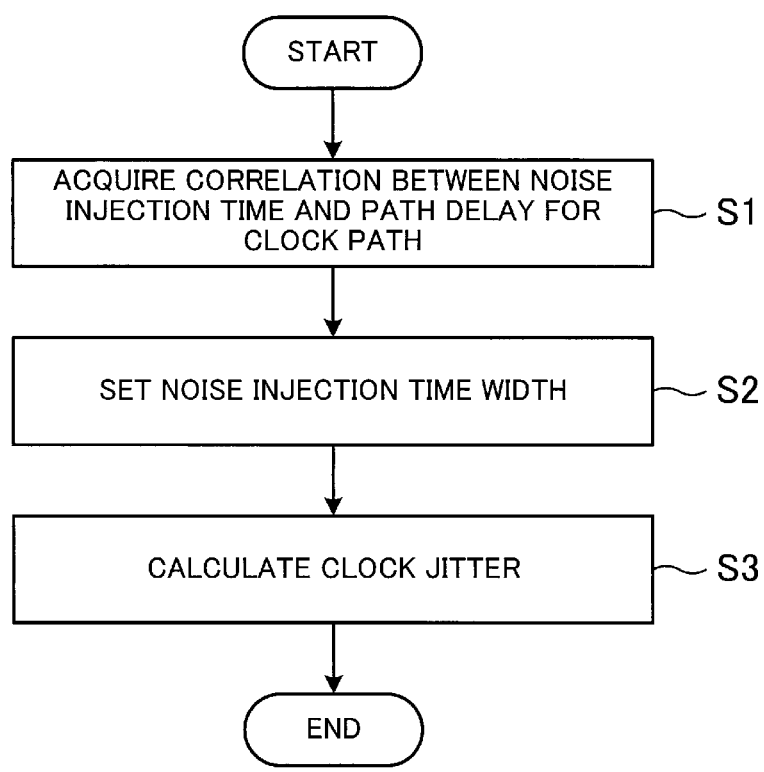
FIG. 3 illustrates an example of a design method.

FIG. 2 illustrates an example of a design apparatus. FIG. 3 illustrates an example of a design method.

A design apparatus 10 illustrated in FIG. 2 includes an acquisition section 11, a setting section 12, and a calculation section 13. Furthermore, the design apparatus 10 has various pieces of information, that is to say, circuit information 21, noise signal setting information 22, a correlation 23, input clock information 24, a noise injection time width 25, and clock jitter 26. These pieces of information are stored in, for example, a storage section, such as a memory, included in the design apparatus 10.

Figure 4:
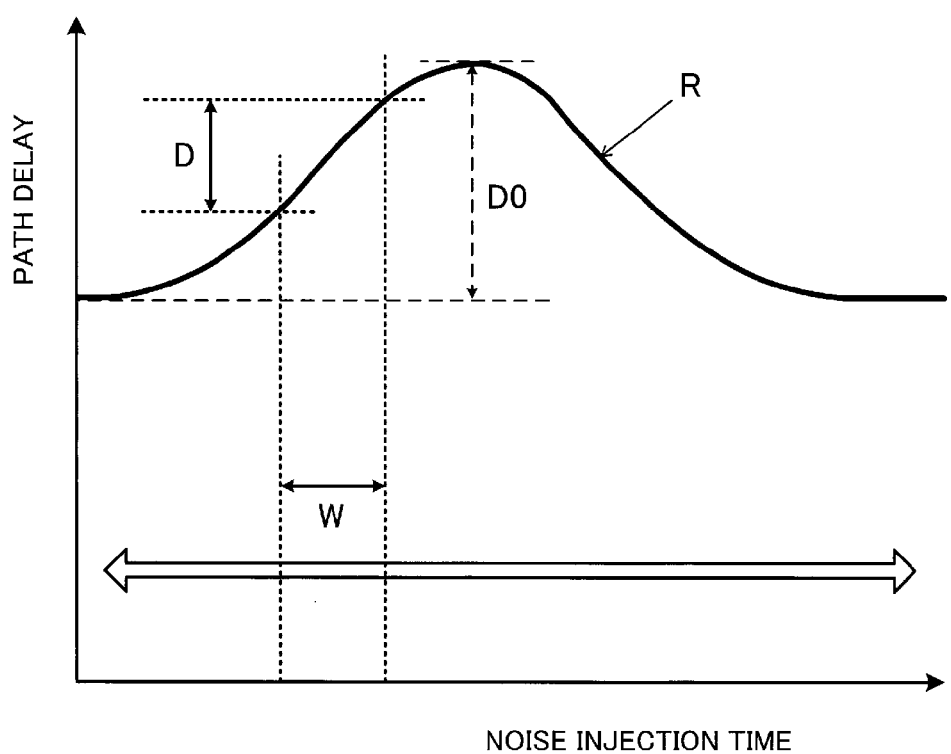
FIG. 4 illustrates an example of a correlation between noise injection time and path delay.

The acquisition section 11 of the design apparatus 10 acquires information indicative of a correlation between timing at which the power supply noise signal 6a is applied to the clock path 5 whose clock jitter J is to be estimated (noise injection time) and a path delay of the clock path 5 whose clock jitter J is to be estimated at the time of the power supply noise signal 6a being applied (step S1 in FIG. 3). An example of a correlation between noise injection time and a path delay is illustrated in FIG. 4. The acquisition section 11 acquires a correlation R illustrated in FIG. 4 for the clock path 5 whose clock jitter J is to be estimated.

For example, the acquisition section 11 performs the following process to acquire the correlation R.

First the acquisition section 11 sets the clock path 5 whose clock jitter J is to be estimated. The acquisition section 11 uses the circuit information 21 regarding the semiconductor integrated circuit 1 to be designed for selecting and extracting the clock path 5 whose clock jitter J is to be estimated and which is included in the semiconductor integrated circuit 1. Alternatively, the acquisition section 11 uses the circuit information 21 for generating a clock path assumed as the clock path 5 whose clock jitter J is to be estimated. The circuit information 21 includes information regarding net connection (net connection information (netlist)) acquired in logic design or information regarding placement and routing (layout information (placement and routing information)) acquired in physical design (layout design).

Next, the acquisition section 11 uses the noise signal setting information 22 for setting the power supply noise signal (waveform) 6a. The noise signal setting information 22 includes design constraints or power supply noise analysis results regarding the semiconductor integrated circuit 1 to be designed or both of the design constraints and the power supply noise analysis results. The design constraints include information indicative of a static IR-drop and clock latency stipulated in the specifications of the semiconductor integrated circuit 1 to be designed. The power supply noise analysis results include information indicative of the result of a power supply noise analysis performed on the semiconductor integrated circuit 1 to be designed. For example, the acquisition section 11 uses the information indicative of the static IR-drop and the clock latency included in the design constraints included in the noise signal setting information 22 for setting a waveform of the power supply noise signal 6a which may propagate along the target clock path 5. Alternatively, if a waveform of the power supply noise signal 6a which propagates along the target clock path 5 is ascertained from the power supply noise analysis results included in the noise signal setting information 22, then the acquisition section 11 sets the waveform as the power supply noise signal 6a.

If plural or plural kinds of power supply noise signals are generated on the power supply line 6, such as if the logic circuit 7 includes plural logic circuit sections which operate at different frequencies, then a signal obtained by combining these power supply noise signals is set as the power supply noise signal 6a.

In many cases, the power supply noise signal 6a generated in the semiconductor integrated circuit 1 has a constant cycle. In those cases, there is a constant correlation between the cycle of the power supply noise signal 6a and a path delay or clock jitter.

The acquisition section 11 uses the clock path 5 and the power supply noise signal 6a each of which is set in the above way and does circuit simulations. In this case, the acquisition section 11 fixes an input clock signal on the clock path 5, scans the power supply noise signal 6a within one cycle of the input clock signal, and measures a path delay. Alternatively, the acquisition section 11 fixes the power supply noise signal 6a on the clock path 5, scans one cycle of an input clock signal with respect to the power supply noise signal 6a, and measures a path delay. That is to say, the acquisition section 11 changes the input timing of one of the input clock signal and the power supply noise signal 6a with respect to the other and measures a path delay of the clock path 5. In this case, a clock signal which differs in waveform from the clock signal CLK outputted from the circuit 2 arranged before the clock path 5 may be used as the input clock signal. Furthermore, circuit simulations may be performed by the use of Simulation Program with Integrated Circuit Emphasis (SPICE).

By doing circuit simulations in this way, the acquisition section 11 acquires the dependence of a path delay on noise injection time of the clock path 5, that is to say, the correlation R between noise injection time and a path delay illustrated in FIG. 4 (correlation 23 in FIG. 2). As illustrated in FIG. 4, a graph of the correlation R is made and is displayed on a display section, such as a monitor, included in the design apparatus 10.

The setting section 12 included in the design apparatus 10 sets noise injection time width W (in FIG. 4) based on information regarding the clock signal (clock signal outputted from the circuit 2 arranged before the clock path 5) CLK inputted to the clock path 5 whose clock jitter J is to be estimated (step S2 in FIG. 3).

At this time the setting section 12 uses, for example, information indicative of the frequency (cycle) and jitter of the clock signal CLK outputted from the circuit 2 which is included in the input clock information 24 for calculating the maximum value (cycle±jitter) of the length of one cycle of the clock signal CLK. The setting section 12 sets the calculated maximum value of the length of one cycle (maximum length of one cycle) of the clock signal CLK as the noise injection time width W (noise injection time width 25 in FIG. 2).

In the above description, the setting section 12 sets the noise injection time width W after the above acquisition section 11 acquires the correlation R. However, at the time when the target clock path 5 is set, the setting section 12 may set the noise injection time width W by the use of the cycle and jitter of the clock signal CLK inputted to the clock path 5.

The calculation section 13 included in the design apparatus 10 uses the correlation 23 (R) acquired by the acquisition section 11 and the noise injection time width 25 (W) set by the setting section 12 for calculating the clock jitter J of the clock path 5 along which the clock signal CLK is transmitted (step S3 in FIG. 3).

As illustrated in FIG. 4, at this time the calculation section 13 scans the correlation R over the noise injection time width W (indicated by a thick arrow) and calculates the differences D between path delays within the noise injection time width W. The calculation section 13 estimates the maximum value of the calculated differences D to be the clock jitter J of the clock path 5 (clock jitter 26 in FIG. 2).

Figure 5:
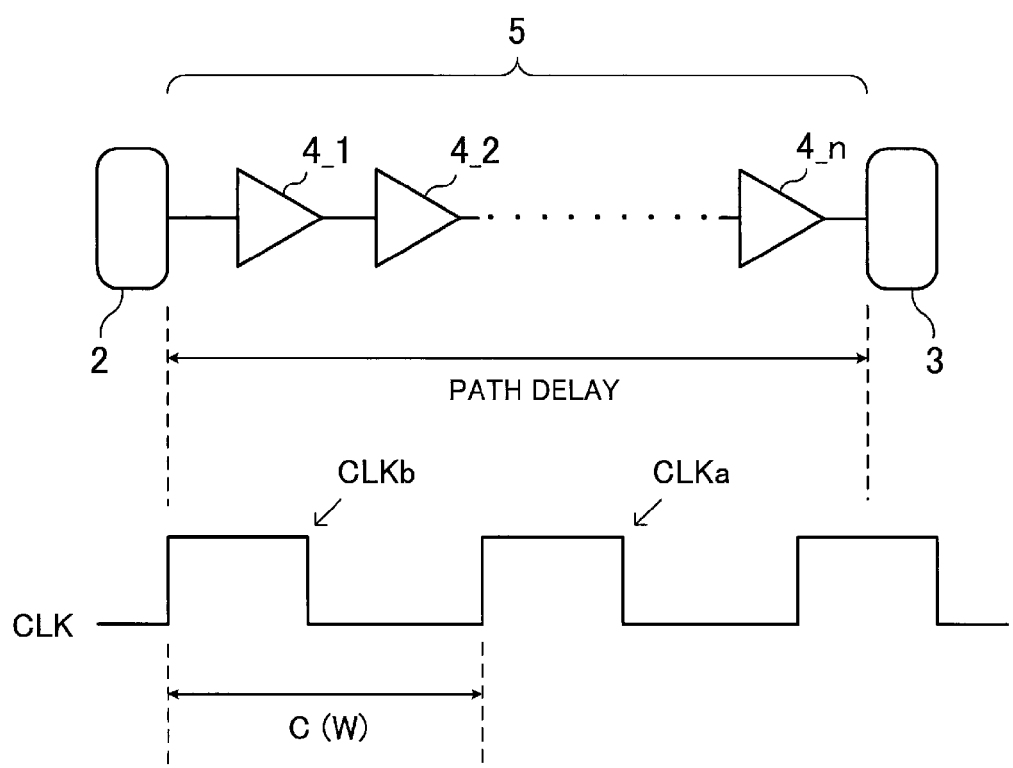
FIG. 5 is a view for describing the relationship between a path delay of a clock path and a cycle of a clock signal.

Estimation of the above clock jitter J and the relationship between a path delay of the clock path 5 and a cycle of the clock signal CLK will now be described with reference to FIGS. 1A through 5. FIG. 5 is a view for describing the relationship between a path delay of the clock path and a cycle of the clock signal.

The minimum path delay and the maximum path delay of the clock path 5 within the constant noise injection time width W and the difference between them are found from the correlation R (23) acquired in the above way. Furthermore, the maximum length of one cycle of the clock signal CLK inputted to the clock path 5 is found from the input clock information 24.

By the way, with the improvement of the performance and function of the semiconductor integrated circuit 1, the frequency of the clock signal CLK transmitted along the clock path 5 becomes lower. On the other hand, the clock path 5 and its path delay may lengthen depending on the structure of the semiconductor integrated circuit 1.

It is assumed that the length of one cycle of the clock signal CLK is short in relation to a path delay. As illustrated in FIG. 5, before a clock pulse CLKa reaches from the circuit 2 to the circuit 3, the next clock pulse CLKb is inputted to the clock path 5. That is to say, plural clock pulses are transmitted in order along the clock path 5.

Fluctuations in clock jitter are caused by applying a power supply noise signal at a certain timing at the time of a clock pulse being transmitted along a clock path. If the length of one cycle of the clock signal CLK is short in relation to a path delay, then plural clock pulses (CLKa, CLKb, and so on) of the clock signal CLK transmitted along the clock path 5 are influenced at the same time by the power supply noise signal 6a. At this time the difference in noise injection time between the clock pulse CLKa and the next clock pulse CLKb does not exceed the maximum length C of one cycle of the clock signal CLK. That is to say, it is safe to consider the maximum length of one cycle of the clock signal CLK as a difference (width) in noise injection time. The difference between path delays within the maximum length of one cycle of the clock signal CLK is clock jitter.

In view of above point, the design apparatus 10 calculates the maximum length C of one cycle of the clock signal CLK and sets it as the noise injection time width W. Furthermore, as illustrated in FIG. 4, the design apparatus 10 uses the correlation R, scans the correlation R over the set noise injection time width W, calculates the differences D between path delays within the noise injection time width W, and estimates the maximum value of the calculated differences D between path delays to be the clock jitter J.

With the technique of considering the difference between the maximum path delay and the minimum path delay of the clock path 5 as the clock jitter J, the difference D0 between the maximum path delay and the minimum path delay illustrated in FIG. 4, that is to say, the worst value is estimated to be the clock jitter J. However, it is safe to estimate the clock jitter J of the clock path 5 along which the clock signal CLK is transmitted to be the maximum value of the differences D between path delays described above. With the technique of estimating the difference D0, which is the worst value, to be the clock jitter J, the clock jitter J is overestimated.

The design apparatus 10 acquires the correlation R between noise injection time and a path delay of the clock path 5 and limits a path delay range. That is to say, the design apparatus 10 limits a path delay range by the noise injection time width W based on conditions (cycle and jitter) of the clock signal CLK inputted. As a result, the clock jitter J is estimated to be the difference D which is smaller than the difference D0 that is the worst value, so the clock jitter J of the clock path 5 estimated is reduced.

Examples in which a design technique using the above design apparatus 10 is applied to a process for estimating the clock jitter J and a process for verifying the clock jitter J included in a procedure for the design of the semiconductor integrated circuit 1 will now be described as second and third embodiments.

First an example of a procedure for the design of the semiconductor integrated circuit 1 will be described with reference to FIG. 6.

The design of the semiconductor integrated circuit 1 includes a logic design process (step S10), a layout design process (step S11), a timing verification process (step S12), a physical verification process (step S13), and a tape-out process (step S14).

In the logic design process (step S10), logic synthesis is performed by the use of register transfer level (RTL) design data and gate-level net connection information (netlist) is generated.

In the layout design process (step S11), the net connection information generated in the logic design process and a timing constraint are used for placing logical functions (cells and blocks) and performing wiring, and layout information (placement and routing information) is generated.

In the timing verification process (step S12), the operation of a circuit included in the layout information after the layout design process is verified.

In the physical verification process (step S13), whether a circuit included in the layout information after the layout design process meets design rules, that is to say, a circuit included in the layout information after the layout design process is connected correctly is verified.

Final circuit information for the semiconductor integrated circuit 1 is prepared (taped-out) through the above processes (step S14).

Of the above processes, the layout design process in step S11 further includes a floor plan subprocess (step S11a), a power supply wiring subprocess (step S11b), a clock tree generation subprocess (step S11c), a clock jitter estimation subprocess (step S11d), a placement and routing subprocess (step S11e), a power supply verification subprocess (step S11f), and a clock jitter verification subprocess (step S11g).

In the floor plan subprocess (step S11a), the net connection information and the like after the logic design process are used for placing the logical functions (cells and blocks).

In the power supply wiring subprocess (step S11b), a circuit (power supply distribution circuit) which distributes power supplies to the logical functions placed by the use of the net connection information and the like is designed.

In the clock tree generation subprocess (step S11c), a circuit (clock distribution circuit) which distributes clock signals to the logical functions placed by the use of the net connection information and the like is designed with the distance between logical functions, a clock skew, and the like taken into cosideration.

In the clock jitter estimation subprocess (step Slid), clock jitter of a clock path included in the designed clock distribution circuit or a clock path assumed as a clock path to be included in the clock distribution circuit is estimated.

In the placement and routing subprocess (step S11e), the estimated clock jitter is taken into consideration, placement and routing of the logical functions (cells and blocks), the power supply distribution circuit, and the clock distribution circuit and timing design are performed so that the estimated clock jitter will be tolerated, and layout information is generated.

In the power supply verification subprocess (step S11f), the layout information after the placement and routing subprocess is used, the wiring resistance, the capacitance, and the like of designed circuits are taken into consideration, and wiring cross talk, a power supply voltage drop, power supply noise, and the like are verified and analyzed. For example, verification results or analysis results may not meet the specifications of the semiconductor integrated circuit 1. That is to say, the procedure returns to the logic design process, the floor plan subprocess of the layout design process, or the like depending on the contents of verification results or analysis results, the obtained verification results or analysis results are taken into consideration, and the process or the subprocess is performed again.

In the clock jitter verification subprocess (step S11g), the layout information after the power supply verification subprocess and power supply noise analysis results are used and clock jitter of each clock path included in the designed circuits is verified. For example, verification results may not meet the specifications of the semiconductor integrated circuit 1. That is to say, the procedure returns to the logic design process, the floor plan subprocess of the layout design process, or the like depending on the contents of verification results, the obtained verification results are taken into consideration, and the process or the subprocess is performed again.

Layout information used in the timing verification process (step S12) or the physical verification process (step S13) is generated by the layout design process (step S11) including the above subprocesses.

The design technique using the above design apparatus 10 is applicable to the clock jitter estimation subprocess (step S11d) and the clock jitter verification subprocess (step S11g) included in the procedure for the design of the semiconductor integrated circuit 1 including the above processes.

First an example in which the design technique using the above design apparatus 10 is applied to the clock jitter estimation subprocess (step S11d in FIG. 6) will be described as a second embodiment.

Figure 7:
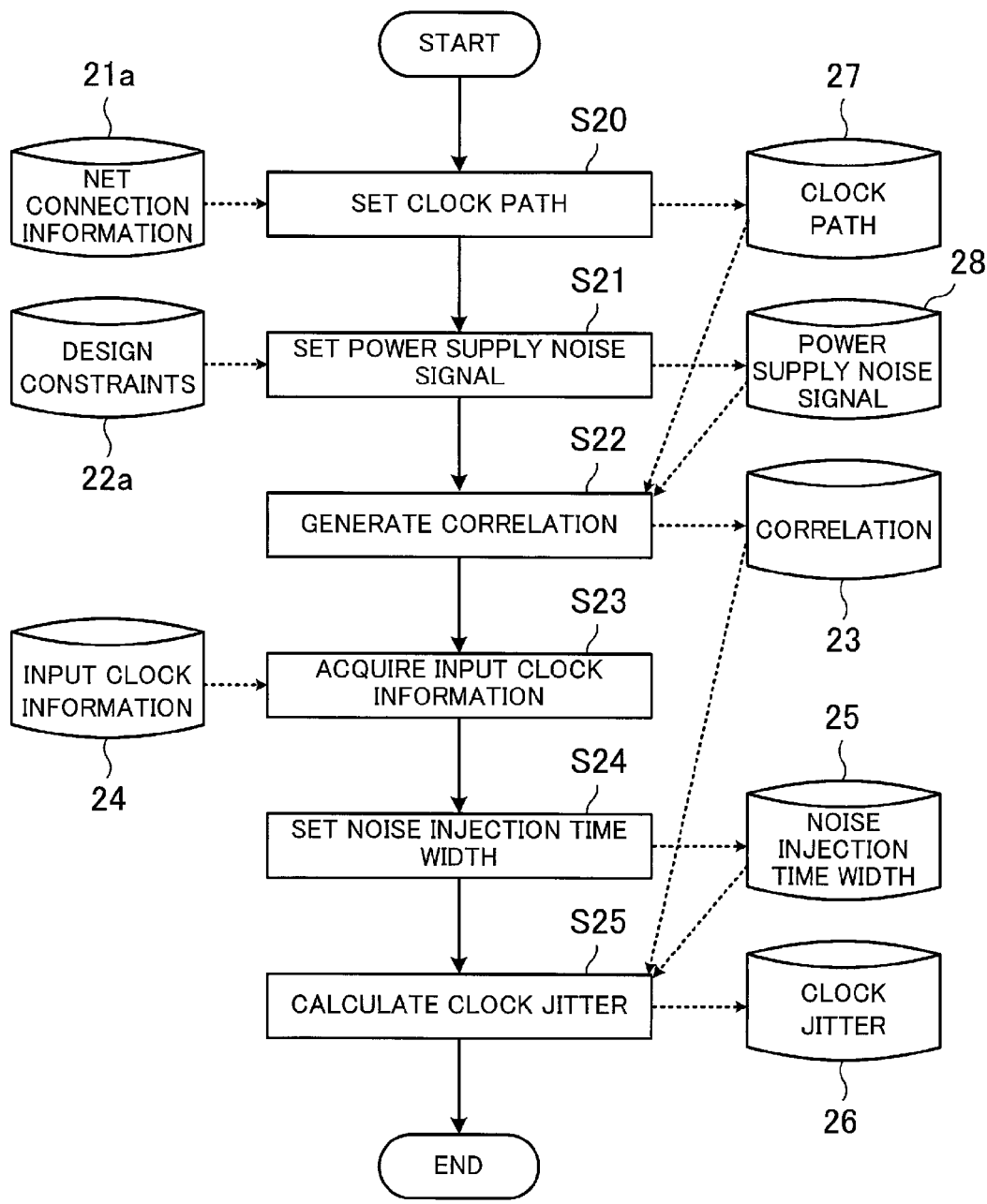
FIG. 7 illustrates an example of the flow of clock jitter estimation.

FIG. 7 illustrates an example of the flow of clock jitter estimation.

In the clock jitter estimation subprocess using the design apparatus 10 (FIG. 2), first the acquisition section 11 sets a clock path whose clock jitter is to be estimated (step S20 in FIG. 7). For example, the acquisition section 11 selects and extracts a clock path whose clock jitter is to be estimated from a clock distribution circuit designed on the basis of net connection information 21a (circuit information 21 in FIG. 2) after the logic design process (step S10 in FIG. 6). Alternatively, the acquisition section 11 generates a clock path assumed as a clock path whose clock jitter is to be estimated from the net connection information 21a or a clock distribution circuit designed on the basis of the net connection information 21a.

Figure 8:
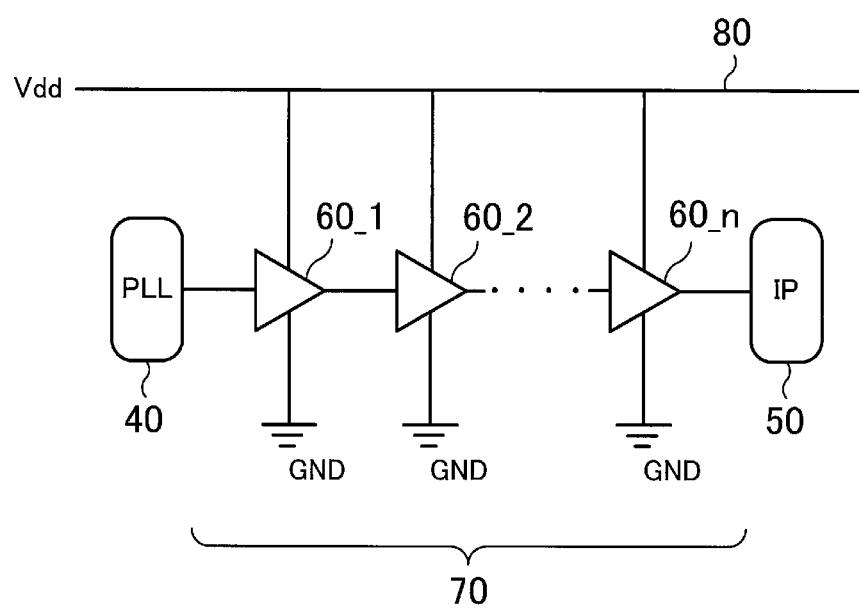
FIG. 8 illustrates an example of a clock path whose clock jitter is to be estimated.

FIG. 8 illustrates an example of a clock path whose clock jitter is to be estimated.

A clock path 70 illustrated in FIG. 8 connects a PLL 40 and an IP 50. The clock path 70 includes a plurality of buffers 60_x (x is a natural number from 1 to n) connected. Each buffer 60_x is connected to a power supply line 80 to which power supply voltage Vdd is applied, and is connected to GND. For example, the length of the clock path 70 from the PLL 40 to the IP 50 is 10 mm and 20 buffer 60_x (n=20) each including a transistor having a low threshold voltage (LVt) are connected.

In step S20, first the acquisition section 11 sets, for example, the above clock path 70 as a clock path whose clock jitter is to be estimated. Information indicative of the clock path 70 (clock path 27 in FIG. 7) is stored in the storage section, such as a memory, included in the design apparatus 10.

Next, the acquisition section 11 sets a power supply noise signal (waveform) (step S21 in FIG. 7). For example, the acquisition section 11 uses design constraints 22a (noise signal setting information 22 in FIG. 2) for generating the waveform of a power supply noise signal to be applied to the clock path 70.

Figure 9:
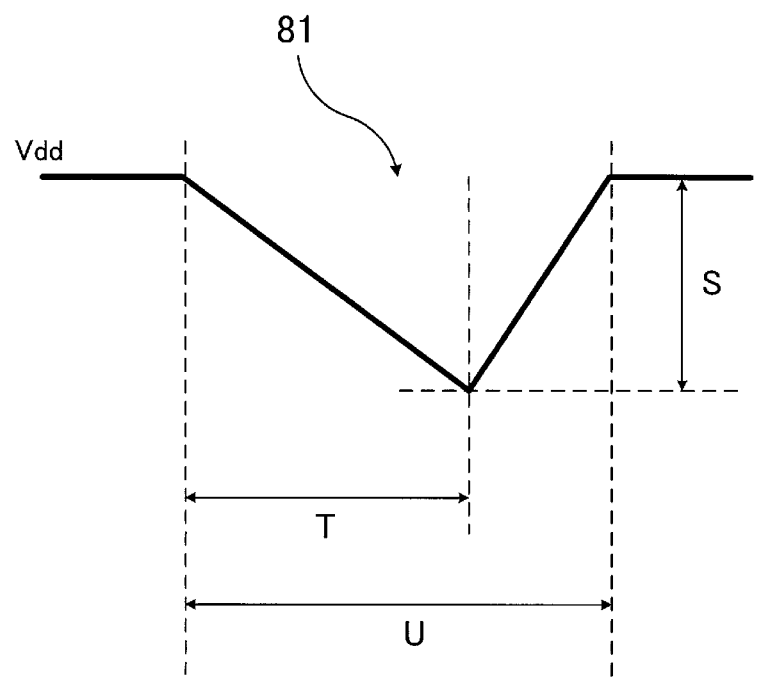
FIG. 9 is a view for describing a method for generating a power supply noise signal.

FIG. 9 is a view for describing a method for generating a power supply noise signal.

For example, the acquisition section 11 uses information indicative of a static IR-drop and clock latency included in the design constraints 22a for generating a power supply noise signal 81 illustrated in FIG. 9. With the power supply noise signal 81, the height of a peak (noise peak) from the power supply voltage Vdd is S, the width to the peak is T, and the entire noise width is U. For example, if a constraint on a static IR-drop is 40 mV and a constraint on clock latency is 2 ns, then the acquisition section 11 generates a triangular power supply noise signal 81 whose noise peak S is 120 mV (40 mV×3) and whose width T is 2 ns. The acquisition section 11 sets the noise width U so that the area of the whole of the triangular power supply noise signal 81 will be equal to an average current consumption.

If plural or plural kinds of power supply noise signals are generated on the power supply line 80 or if it is assumed that plural or plural kinds of power supply noise signals are generated on the power supply line 80, then the acquisition section 11 generates each power supply noise signal after the example of FIG. 9 and combines each power supply noise signal to generate a power supply noise signal to be applied to the clock path 70.

A case where the acquisition section 11 uses the design constraints 22a for setting the power supply noise signal 81 is taken as an example. Alternatively, if the waveform of a power supply noise signal is ascertained from power supply noise analysis results (noise signal setting information 22 in FIG. 2) or the like, then the acquisition section 11 may acquire it and set it as a power supply noise signal to be applied to the clock path 70.

Description will now be given with the power supply noise signal 81 illustrated in FIG. 9 as an example.

In step S21, the acquisition section 11 sets the power supply noise signal 81 to be applied to the clock path 70, for example, in the above way. Information indicative of the power supply noise signal 81 (power supply noise signal 28 in FIG. 7) is stored in the storage section, such as a memory, included in the design apparatus 10.

Next, the acquisition section 11 generates a correlation between noise injection time at which the power supply noise signal 81 is applied to the clock path 70 and a path delay of the clock path 70 at the time of the power supply noise signal 81 being applied (step S22 in FIG. 7).

Figure 10A:
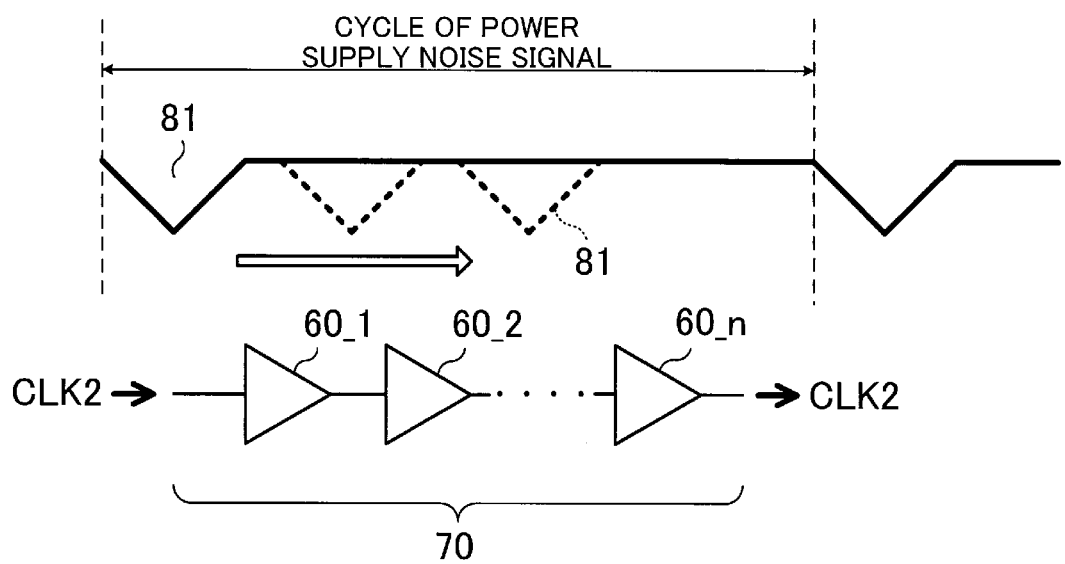
FIGS. 10A and 10B are views for describing a method for generating a correlation.
Figure 10B:
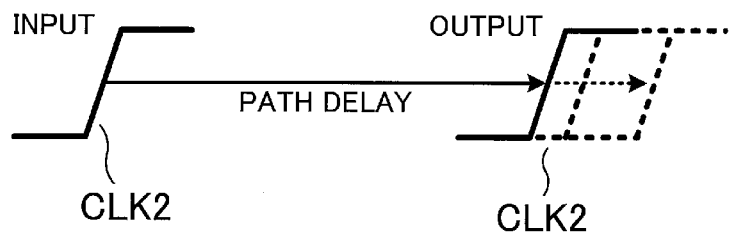
Figure 11:
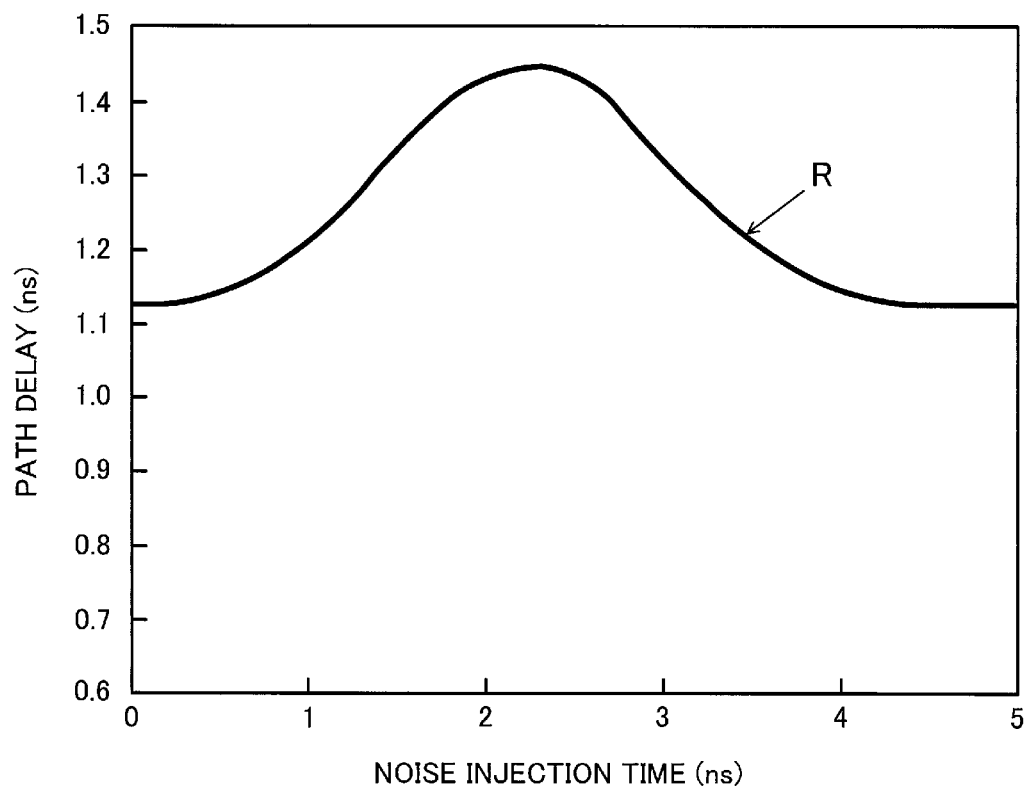
FIG. 11 illustrates an example of a correlation generated.

FIGS. 10A and 10B are views for describing a method for generating a correlation. FIG. 11 illustrates an example of a correlation generated.

The acquisition section 11 uses the clock path 70 (clock path 27 in FIG. 7) and the power supply noise signal 81 (power supply noise signal 28 in FIG. 7) each of which is set in the above way and a proper clock signal CLK2 for doing circuit simulations (SPICE). In this case, a clock signal which differs in waveform from, for example, a clock signal CLK outputted from the PLL 40 arranged before the clock path 70 is used as the clock signal CLK2. For example, if the clock signal CLK outputted from the PLL 40 arranged before the clock path 70 has a frequency of several gigahertz, then the clock signal CLK2 having a frequency of several megahertz is used for generating a correlation between noise injection time and a path delay.

In many cases, the power supply noise signal 81 in the semiconductor integrated circuit 1 is generated in a constant cycle. The acquisition section 11 fixes the clock signal CLK2 on the clock path 70, scans the power supply noise signal 81 within one cycle of the clock signal CLK2 (waveform is indicated by a dashed line and scanning is indicated by a thick arrow), and changes timing at which the power supply noise signal 81 is applied with respect to the clock signal CLK2 (FIG. 10A). The acquisition section 11 measures the clock signal CLK2 outputted at that time from the clock path 70. By doing so, the acquisition section 11 measures a path delay of the clock path 70 and fluctuations in the path delay caused by the application of the power supply noise signal 81 (indicated by a dashed line) (FIG. 10B).

By performing the above operation, the acquisition section 11 generates a correlation R between noise injection time (ns) and a path delay (ns) of the clock path 70 illustrated in FIG. 11.

In the above case, the acquisition section 11 fixes the clock signal CLK2 and changes the input timing of the power supply noise signal 81. However, the acquisition section 11 may fix the power supply noise signal 81 and change the input timing of the clock signal CLK2. By doing so, the acquisition section 11 also acquires the correlation R illustrated in FIG. 11.

In step S22, the acquisition section 11 generates the correlation R, for example, in the above way. Information indicative of the correlation R (correlation 23 in FIG. 7) is stored in the storage section, such as a memory, included in the design apparatus 10.

After the acquisition section 11 acquires the correlation 23 (R), the setting section 12 of the design apparatus 10 acquires from the input clock information 24 information indicative of a frequency (cycle) and jitter of the clock signal CLK outputted from the PLL 40 (step S23 in FIG. 7). The setting section 12 then calculates the maximum length (cycle±jitter) of one cycle of the clock signal CLK by the use of the acquired information regarding the clock signal CLK and sets it as noise injection time width W (step S24 in FIG. 7).

For example, it is assumed that the frequency and jitter of the clock signal CLK outputted from the PLL 40 are 2 GHz (cycle 0.5 ns) and ±10 ps, respectively, according to the specifications. The input clock information 24 includes information indicative of the frequency (cycle) and jitter of the clock signal CLK. The setting section 12 acquires from the input clock information 24 information indicative of the frequency and jitter of the clock signal CLK inputted to the clock path 70 whose clock jitter is to be estimated. In this example, information acquired by the setting section 12 is 2 GHz (cycle 0.5 ns) and ±10 ps.

The setting section 12 calculates the maximum length (cycle±jitter) of one cycle of the clock signal CLK by the use of the acquired information, that is to say, the cycle 0.5 ns and the jitter ±10 ps. In this example, the maximum length of one cycle of the clock signal CLK is 0.52 ns. The setting section 12 sets 0.52 ns, which is the maximum length of one cycle of the clock signal CLK, as the noise injection time width W.

In steps S23 and S24, the setting section 12 sets the noise injection time width W, for example, in the above way. Information indicative of the noise injection time width W (noise injection time width 25 in FIG. 7) is stored in the storage section, such as a memory, included in the design apparatus 10.

After the setting section 12 sets the noise injection time width W, the calculation section 13 of the design apparatus 10 calculates clock jitter of the clock path 70 by the use of the correlation 23 (R) and the noise injection time width 25 (W) (step S25 in FIG. 7).

Figure 12:
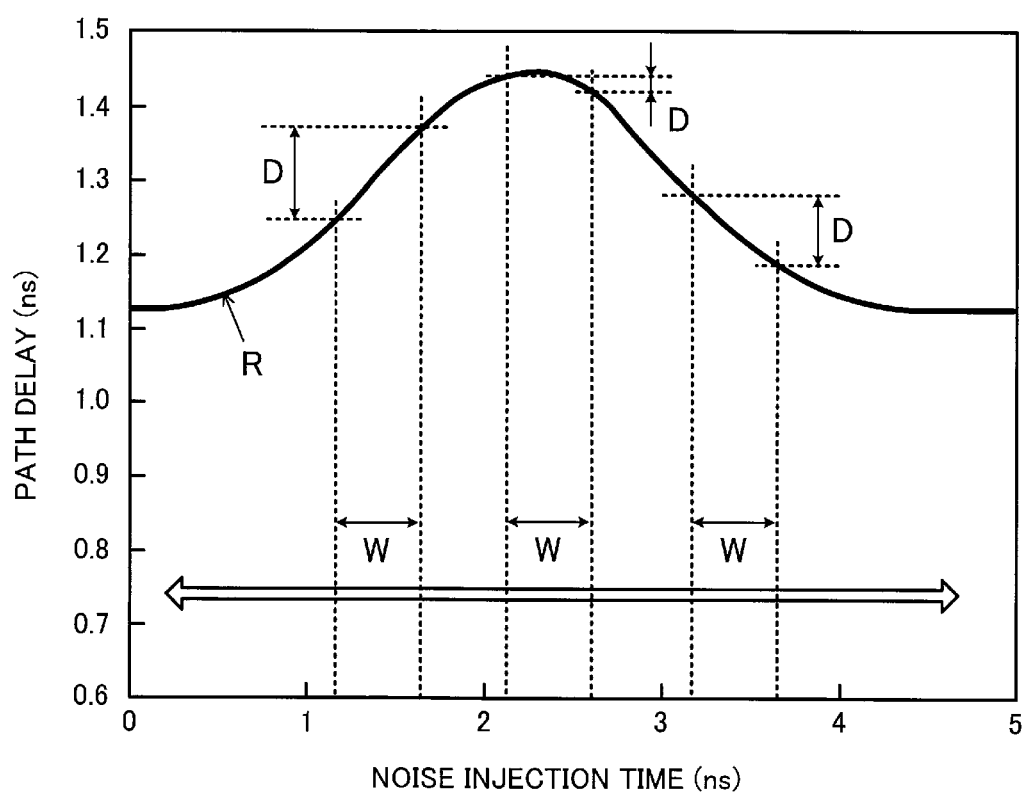
FIG. 12 is a view for describing a clock jitter calculation method (part 1)
Figure 13:
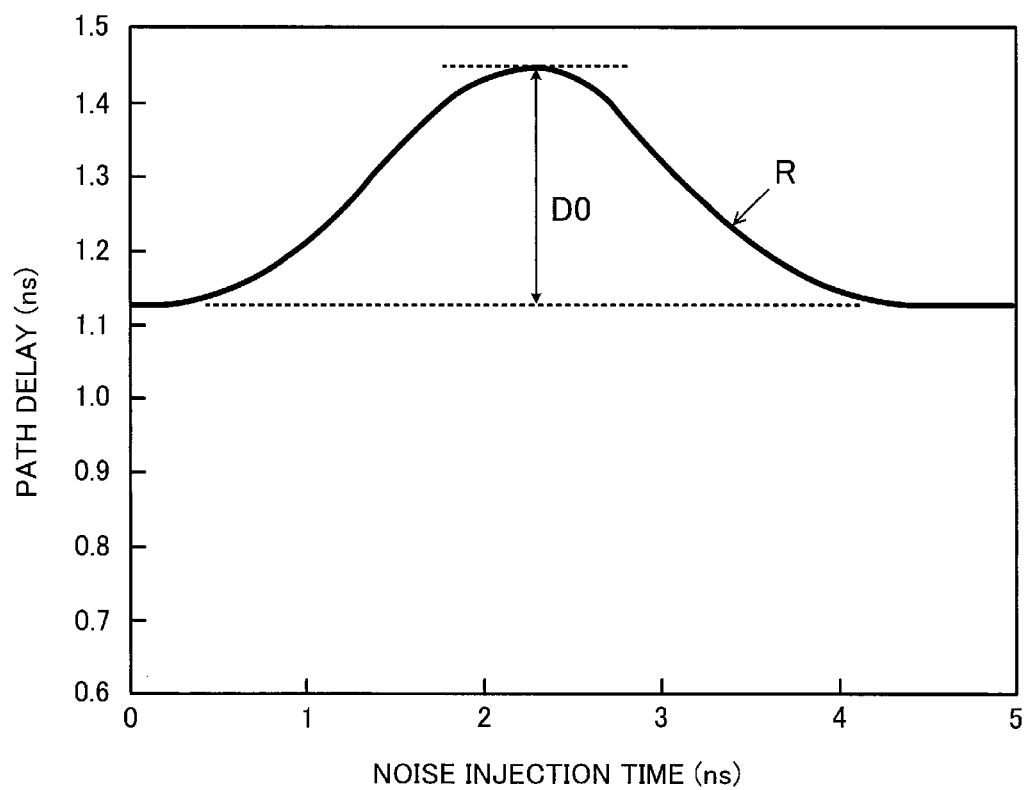
FIG. 13 is a view for describing a clock jitter calculation method (part 2)

FIGS. 12 and 13 are views for describing a clock jitter calculation method.

As illustrated in FIG. 12, the calculation section 13 scans the correlation R acquired for the clock path 70 over the set noise injection time width W (0.52 ns) and calculates the differences D between path delays (differences D between the maximum path delay and the minimum path delay) within the noise injection time width W. The calculation section 13 estimates the maximum value of the calculated differences D to be clock jitter J of the clock path 70. Information indicative of the clock jitter J (clock jitter 26 in FIG. 7) is stored in the storage section, such as a memory, included in the design apparatus 10.

0.52 ns which is the maximum length of one cycle of the clock signal CLK and which is set as the noise injection time width W is shorter than a path delay (about 1.13 ns (minimum value) to about 1.45 ns (maximum value)) of the clock path 70. In this case, plural clock pulses of the clock signal CLK are transmitted in order along the clock path 70 and the plural clock pulses transmitted are influenced at the same time by the power supply noise signal 81 applied at a certain timing. At this time the difference in noise injection time between a clock pulse and the next clock pulse does not exceed 0.52 ns which is the maximum length of one cycle of the clock signal CLK. Accordingly, the maximum value of the differences (D) between path delays within 0.52 ns, which is the maximum length of one cycle of the clock signal CLK, is estimated to be the clock jitter J.

As illustrated in FIG. 12, the calculation section 13 scans the correlation R over the set noise injection time width W, calculates the differences D between path delays within the noise injection time width W, and considers the maximum value of the differences D as the clock jitter J. With the technique of considering the difference between the maximum path delay and the minimum path delay of the clock path 70 as the clock jitter J, on the other hand, the difference DO between the maximum path delay and the minimum path delay illustrated in FIG. 13, that is to say, the worst value is estimated to be the clock jitter J. In view of the above problem, a path delay range is limited by 0.52 ns (noise injection time width W) which is the maximum length of one cycle of the clock signal CLK inputted to the clock path 70. By doing so, the clock jitter J is estimated to be the difference D which is smaller than the difference DO which is the worst value.

The design apparatus 10 acquires the correlation R between noise injection time and a path delay of the clock path 70 by circuit simulations and sets the noise injection time width W based on conditions (cycle and jitter) of the clock signal CLK inputted to the clock path 70. The design apparatus 10 then limits a path delay range by the noise injection time width W and estimates the clock jitter J of the clock path 70 within that range. This makes it possible to prevent overestimation and estimate the clock jitter J simply and properly.

Next, an example in which the design technique using the above design apparatus 10 is applied to the clock jitter verification subprocess (step S11g in FIG. 6) will be described as a third embodiment.

Figure 14:
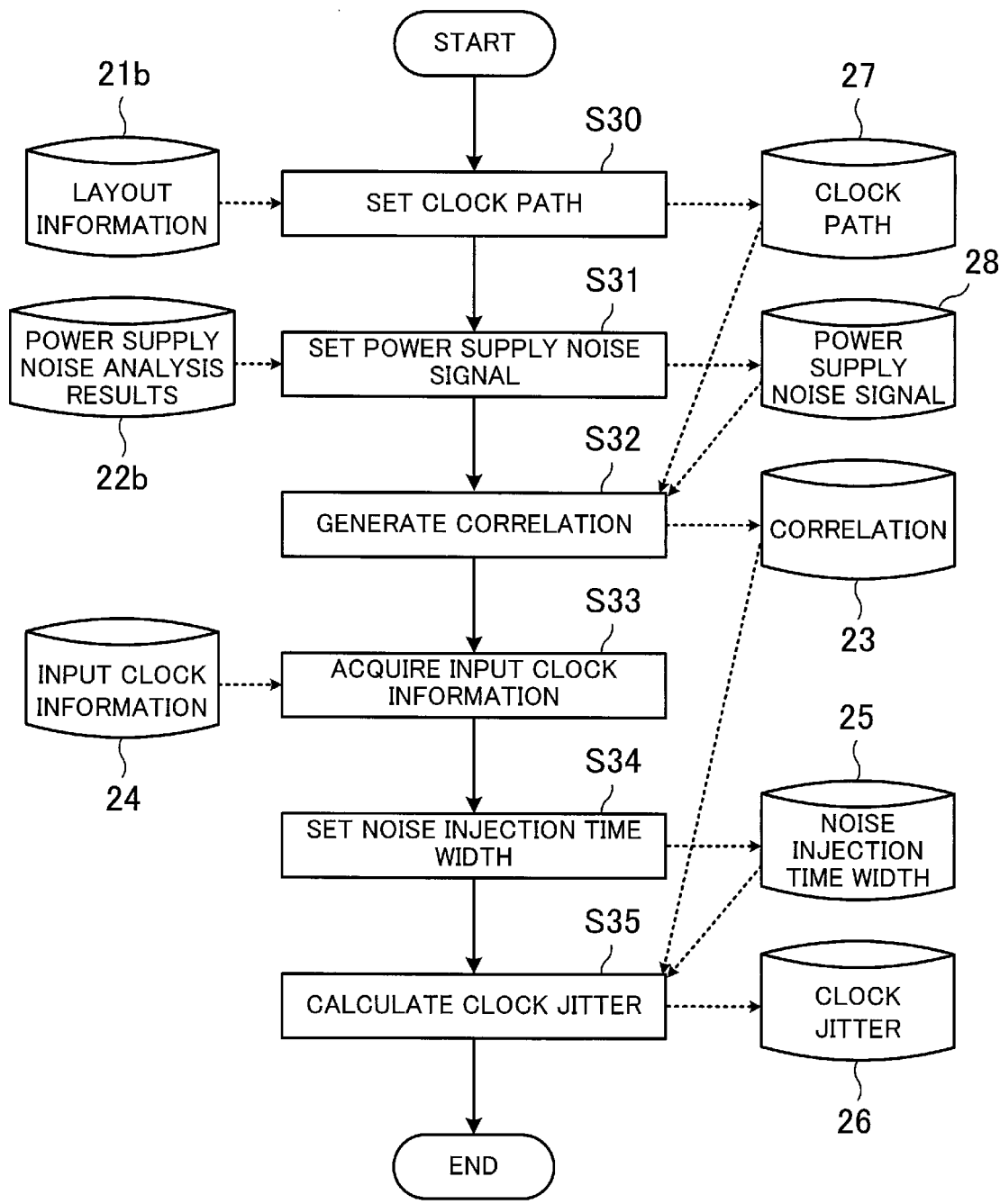
FIG. 14 illustrates an example of the flow of clock jitter verification.

FIG. 14 illustrates an example of the flow of clock jitter verification.

In the clock jitter verification subprocess using the design apparatus 10 (FIG. 2), first the acquisition section 11 sets a clock path to be verified (step S30 in FIG. 14). For example, the acquisition section 11 selects and extracts a clock path whose clock jitter is to be verified from layout information 21b (circuit information 21 in FIG. 2) after the placement and routing subprocess (step S11e in FIG. 6) or the power supply noise verification subprocess (step S11f in FIG. 6). Alternatively, the acquisition section 11 generates a clock path assumed as a clock path to be verified. Information indicative of the clock path to be verified (clock path 27 in FIG. 14) is stored in the storage section, such as a memory, included in the design apparatus 10.

Next, the acquisition section 11 sets a power supply noise signal (waveform) (step S31 in FIG. 14).

Figure 6:
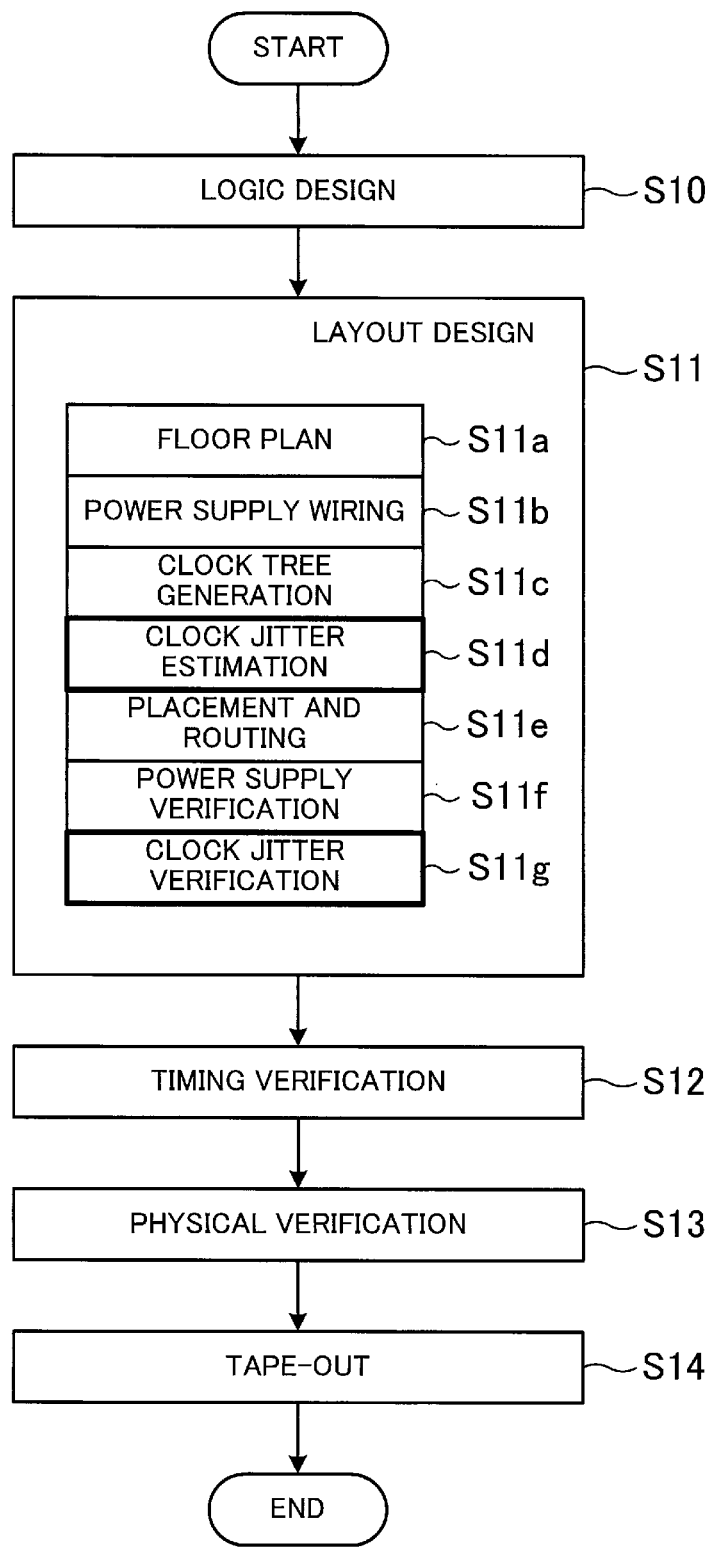
FIG. 6 illustrates an example of a procedure for designing a semiconductor integrated circuit.

At this time the acquisition section 11 selects and extracts a power supply noise signal to be applied to the clock path to be verified from power supply noise analysis results 22b (noise signal setting information 22 in FIG. 2) obtained in the power supply verification subprocess (step Sllf in FIG. 6). Information indicative of the power supply noise signal (power supply noise signal 28 in FIG. 14) is stored in the storage section, such as a memory, included in the design apparatus 10.

In the clock jitter verification subprocess, the acquisition section 11 may set a power supply noise signal by the use of information indicative of a static IR-drop and clock latency included in design constraints (noise signal setting information 22 in FIG. 2). This is the same with the above clock jitter estimation subprocess (second embodiment).

After the acquisition section 11 sets the clock path to be verified and the power supply noise signal, the acquisition section 11 generates a correlation between noise injection time at which the power supply noise signal is applied to the clock path and a path delay of the clock path at the time of the power supply noise signal being applied (step S32 in FIG. 14).

At this time the acquisition section 11 does circuit simulations (SPICE) by the use of the clock path to be verified and the power supply noise signal each of which is set in the above way and a proper clock signal (which differs in waveform from a clock signal outputted from a circuit placed before the clock path to be verified). In this case, the acquisition section 11 fixes the clock signal on the clock path, scans the power supply noise signal within one cycle of the clock signal, and measures a path delay of the clock path. By doing so, the acquisition section 11 generates a correlation between noise injection time and a path delay of the clock path to be verified. Alternatively, the acquisition section 11 fixes the power supply noise signal, changes the input timing of the clock signal, and generates a correlation between noise injection time and a path delay of the clock path to be verified. Information indicative of the correlation (correlation 23 in FIG. 14) is stored in the storage section, such as a memory, included in the design apparatus 10.

After the acquisition section 11 acquires the correlation, the setting section 12 of the design apparatus 10 acquires from the input clock information 24 information indicative of a frequency (cycle) and jitter of the clock signal inputted to the clock path to be verified (from the circuit placed therebefore) (step S33 in FIG. 14).

The setting section 12 then calculates the maximum length (cycle±jitter) of one cycle of the clock signal by the use of the acquired information regarding the clock signal and sets it as noise injection time width (step S34 in FIG. 14). Information indicative of the noise injection time width (noise injection time width 25 in FIG. 14) is stored in the storage section, such as a memory, included in the design apparatus 10.

After the setting section 12 sets the noise injection time width, the calculation section 13 of the design apparatus 10 calculates clock jitter of the clock path to be verified by the use of the correlation and the noise injection time width (step S35 in FIG. 14). In accordance with the example of FIG. 12, the calculation section 13 scans the correlation acquired for the clock path to be verified over the set noise injection time width and calculates the differences between path delays within the noise injection time width. The calculation section 13 estimates the maximum value of the calculated differences to be clock jitter of the clock path to be verified (clock jitter 26 in FIG. 14).

The design apparatus 10 estimates in this way clock jitter of a clock path included in a circuit on which the power supply verification subprocess (step S11f in FIG. 6) has been performed. For example, the design apparatus 10 determines whether or not the clock jitter estimated in this way is a determined value set on the basis of specifications or is in a determined range set on the basis of the specifications to verify whether or not the clock jitter satisfies the specifications.

The design apparatus 10 also acquires a correlation between noise injection time and a path delay of a clock path to be verified by circuit simulations and sets noise injection time width based on conditions (cycle and jitter) of a clock signal inputted to the clock path. The design apparatus 10 then limits a path delay range by the noise injection time width and estimates clock jitter of the clock path within that range. This makes it possible to estimate clock jitter simply and properly.

The processing functions of the design apparatus 10 described above are realized by the use of a computer.

Figure 15:
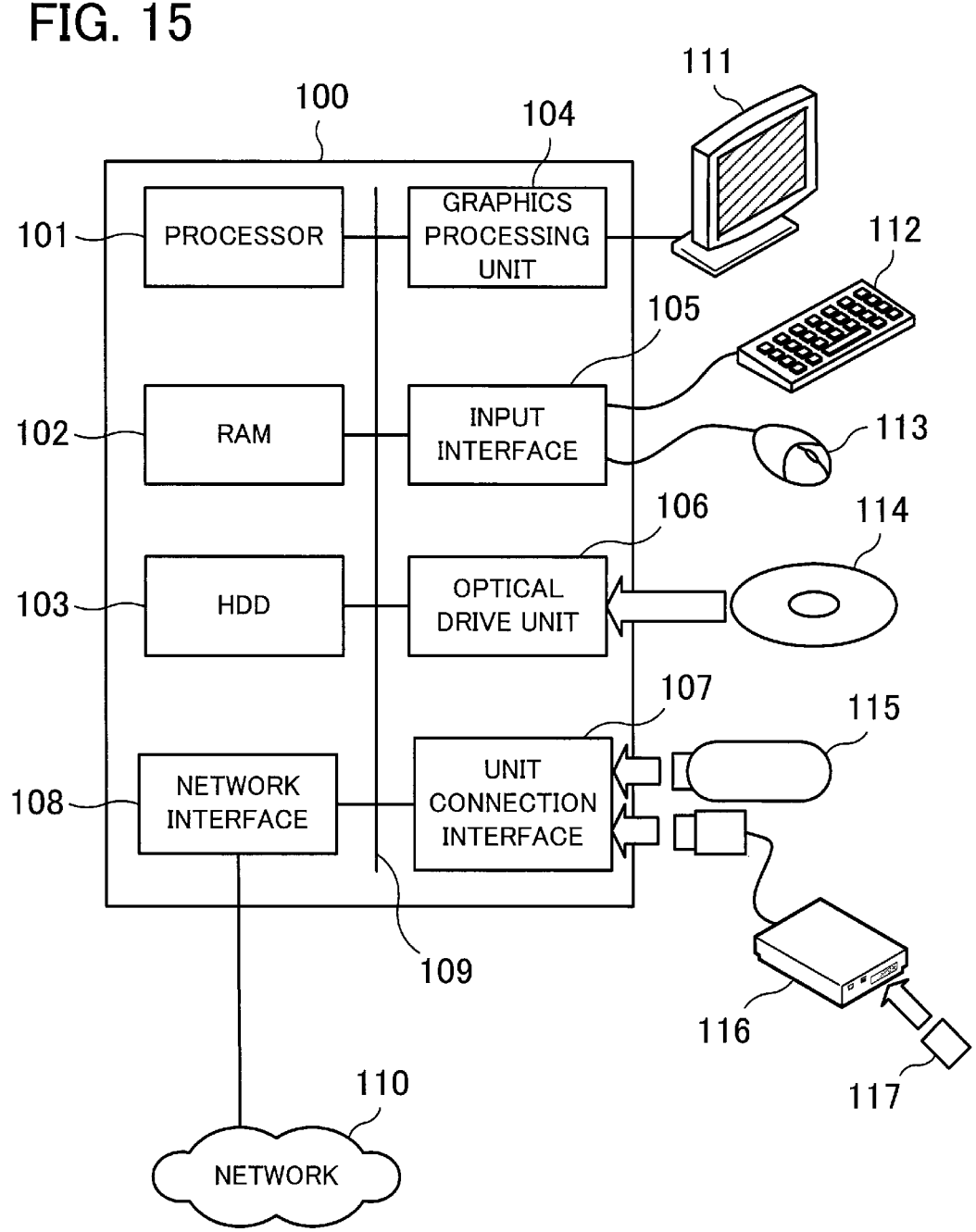
FIG. 15 illustrates an example of the hardware configuration of a computer.

FIG. 15 illustrates an example of the hardware configuration of a computer.

The whole of a computer 100 is controlled by a processor 101. A random access memory (RAM) 102 and a plurality of peripheral units are connected to the processor 101 via a bus 109. The processor 101 may be a multiprocessor. The processor 101 is a central processing unit (CPU), a micro processing unit (MPU), a digital signal processor (DSP), an application specific integrated circuit (ASIC), a programmable logic device (PLD), or the like. The processor 101 may be a combination of two or more of a CPU, a MPU, a DSP, an ASIC, and a PLD.

The RAM 102 is used as main storage of the computer 100. The RAM 102 temporarily stores at least a part of an operating system (OS) program or an application program executed by the processor 101. In addition, the RAM 102 stores various pieces of data which the processor 101 needs to perform a process.

The plurality of peripheral units connected to the bus 109 are a hard disk drive (HDD) 103, a graphics processing unit 104, an input interface 105, an optical drive unit 106, a unit connection interface 107, and a network interface 108.

The HDD 103 magnetically writes data to and reads out data from a built-in disk. The HDD 103 is used as auxiliary storage of the computer 100. The HDD 103 stores the OS program, application programs, and various pieces of data. A semiconductor memory, such as a flash memory, may be used as auxiliary storage.

A monitor 111 is connected to the graphics processing unit 104. The graphics processing unit 104 displays an image on a screen of the monitor 111 in accordance with an instruction from the processor 101. The monitor 111 is a display using a cathode ray tube (CRT), a liquid crystal display, or the like.

A keyboard 112 and a mouse 113 are connected to the input interface 105. The input interface 105 transmits to the processor 101 a signal transmitted from the keyboard 112 or the mouse 113. The mouse 113 is an example of a pointing device and another pointing device, such as a touch panel, a tablet, a touch pad, or a track ball, may be used.

The optical drive unit 106 reads data recorded on an optical disk 114 by the use of a laser beam or the like. The optical disk 114 is a portable record medium on which recorded data can be read by the reflection of light. The optical disk 114 is a digital versatile disc (DVD), a DVD-RAM, a compact disc read only memory (CD-ROM), a CD-recordable(R)/rewritable(RW), or the like.

The unit connection interface 107 is a communication interface used for connecting peripheral units to the computer 100. For example, a memory unit 115 and a memory reader-writer 116 are connected to the unit connection interface 107. The memory unit 115 is a record medium having the function of communicating with the unit connection interface 2107. The memory reader-writer 116 is a unit which writes data to or reads out data from a memory card 117. The memory card 117 is a card-type record medium.

The network interface 108 is connected to a network 110. The network interface 108 transmits data to or receives data from another computer or a communication apparatus via the network 110.

By adopting the above hardware configuration, the processing functions of the design apparatus 10, such as the processing functions (including input of processing conditions, display and storage of processing results, and the like) of the above acquisition section 11, setting section 12, and calculation section 13, are realized.

The computer 100 realizes the processing functions of the design apparatus 10 by executing a program recorded in, for example, a computer-readable record medium. The program in which the contents of a process that is to be performed by the computer 100 are described is recorded in various record media. For example, the program which is to be executed by the computer 100 is stored in the HDD 103. The processor 101 loads at least a part of the program stored in the HDD 103 into the RAM 102 and executes it. Furthermore, the program which is to be executed by the computer 100 may be recorded on a portable record medium, such as the optical disk 114, the memory unit 115, or the memory card 117. The program recorded on a portable record medium is installed in the HDD 103 and then is executed, under the control of, for example, the processor 101. In addition, the processor 101 may read out the program directly from a portable record medium and execute it.

The disclosed design apparatus and design method make it possible to prevent overestimation of clock jitter and estimate clock jitter of a clock path properly.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A design apparatus comprising a processor including:
   an acquisition section configured to acquire a correlation between timing at which a noise signal is applied to a clock path of a semiconductor integrated circuit to be designed and a path delay of the clock path;
   a setting section configured to set a width of the timing based on a first clock signal inputted to the clock path; and
   a calculation section configured to calculate differences between path delays within the width by using the correlation and considers a maximum value of the differences as clock jitter of the clock path,
   wherein the processor is configured to generate layout information including placement and routing of logical functions of the semiconductor integrated circuit by using the clock jitter.

2. The design apparatus according to claim 1, wherein acquiring the correlation includes:
   changing input timing of one cycle of a second clock signal whose one cycle is longer than a length of one cycle of the first clock signal with respect to the noise signal, or changing input timing of the noise signal with respect to one cycle of the second clock signal; and
   measuring the path delay.

3. The design apparatus according to claim 1, wherein the width of the timing of the noise signal is set on the basis of information indicative of a static IR-drop and clock latency included in design constraints on the semiconductor integrated circuit to be designed.

4. The design apparatus according to claim 1, wherein the width of the timing of the noise signal is set on the basis of power supply noise analysis results of the semiconductor integrated circuit to be designed.

5. The design apparatus according to claim 1, further comprising setting the clock path on the basis of circuit information acquired in logic design of the semiconductor integrated circuit to be designed.

6. The design apparatus according to claim 1, further comprising setting the clock path on the basis of circuit information acquired in layout design of the semiconductor integrated circuit to be designed.

7. The design apparatus according to claim 1, wherein the first clock signal is outputted from a circuit section placed before the clock path.

8. The design apparatus according to claim 1, wherein setting the width includes setting as the width a length of one cycle determined by a cycle and jitter of the first clock signal.

9. The design apparatus according to claim 1, wherein a length of one cycle of the first clock signal is shorter than a minimum value of the path delay.

10. The design apparatus according to claim 1, wherein calculating the differences includes scanning a change in the path delay with the timing over the width.

11. A design method comprising:
acquiring, by a processor, a correlation between timing at which a noise signal is applied to a clock path of a semiconductor integrated circuit to be designed and a path delay of the clock path;
setting, by the processor, a width of the timing based on a first clock signal inputted to the clock path;
calculating, by the processor, differences between path delays within the width by using the correlation and considering, by the processor, a maximum value of the differences as clock jitter of the clock path; and
generating, by the processor, layout information including placement and routing of logical functions of the semiconductor integrated circuit by using the clock jitter.

12. A computer-readable, non-transitory record medium storing a program for a computer to execute, the program comprising:
code for acquiring a correlation between timing at which a noise signal is applied to a clock path of a semiconductor integrated circuit to be designed and a path delay of the clock path;
code for setting a width of the timing based on a first clock signal inputted to the clock path;
code for calculating differences between path delays within the width by using the correlation and consider a maximum value of the differences as clock jitter of the clock path; and
code for generating layout information including placement and routing of logical functions of the semiconductor integrated circuit by using the clock jitter.

* * * * *